United States Patent [19]

Lavallee et al.

[11] Patent Number: 4,489,381
[45] Date of Patent: Dec. 18, 1984

[54] HIERARCHICAL MEMORIES HAVING TWO PORTS AT EACH SUBORDINATE MEMORY LEVEL

[75] Inventors: Russell W. Lavallee, Poughkeepsie; Philip M. Ryan, Hopewell Junction; Vincent F. Sollitto, Jr., Rhinebeck, all of N.Y.

[73] Assignee: International Business Machines Corporation, Armonk, N.Y.

[21] Appl. No.: 405,812

[22] Filed: Aug. 6, 1982

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,166,739 | 1/1965 | Haynes | 340/173.1 |
| 3,471,838 | 10/1969 | Ricketts, Jr. et al. | 340/174 |
| 3,675,218 | 7/1972 | Sechler | 340/173 FF |
| 3,806,888 | 4/1974 | Brickman et al. | 340/172.5 |
| 4,020,466 | 4/1977 | Cordi et al. | 340/172.5 |
| 4,125,877 | 11/1978 | Reinert | 365/190 |
| 4,193,127 | 3/1980 | Gersbach | 365/174 |
| 4,253,144 | 2/1981 | Bellamy et al. | 364/200 |

OTHER PUBLICATIONS

"Structured Computer Organization", A. S. Tanenbaum, Prentice-Hall, Inc., 1976, pp. 145-146.
IBM Technical Disclosure Bulletin, vol. 9, No. 7, Dec. 1966, "Double Usage of Read-Only Storage", J. F. Kevill, p. 796.
IBM Technical Disclosure Bulletin, vol. 23, No. 7A, Dec. 1980, "Multi-Port Asymmetrical Memory Cell", R. C. Joy and E. Seewann, p. 2822.

Primary Examiner—Raulfe B. Zache
Attorney, Agent, or Firm—Robert J. Haase

[57] ABSTRACT

A hierarchical memory system is disclosed comprising at least one dual-ported memory level, each port having access to a separate bidirectional data bus. The port facing the higher memory levels is equipped with a pair of data buffers having a bit width equal to the bit width of a single row of cells in the storage array contained within the dual-ported level. One buffer (output) is loaded in one cycle from the array. The outer buffer (input) is emptied in one cycle into the array. Both buffers interact with the higher memory level independently of the transferring of data through the other of the dual ports. Thus, contention for the use of bus facilities and contention for memory cycles are greatly reduced in the transferring of data between the memory levels.

10 Claims, 1 Drawing Figure

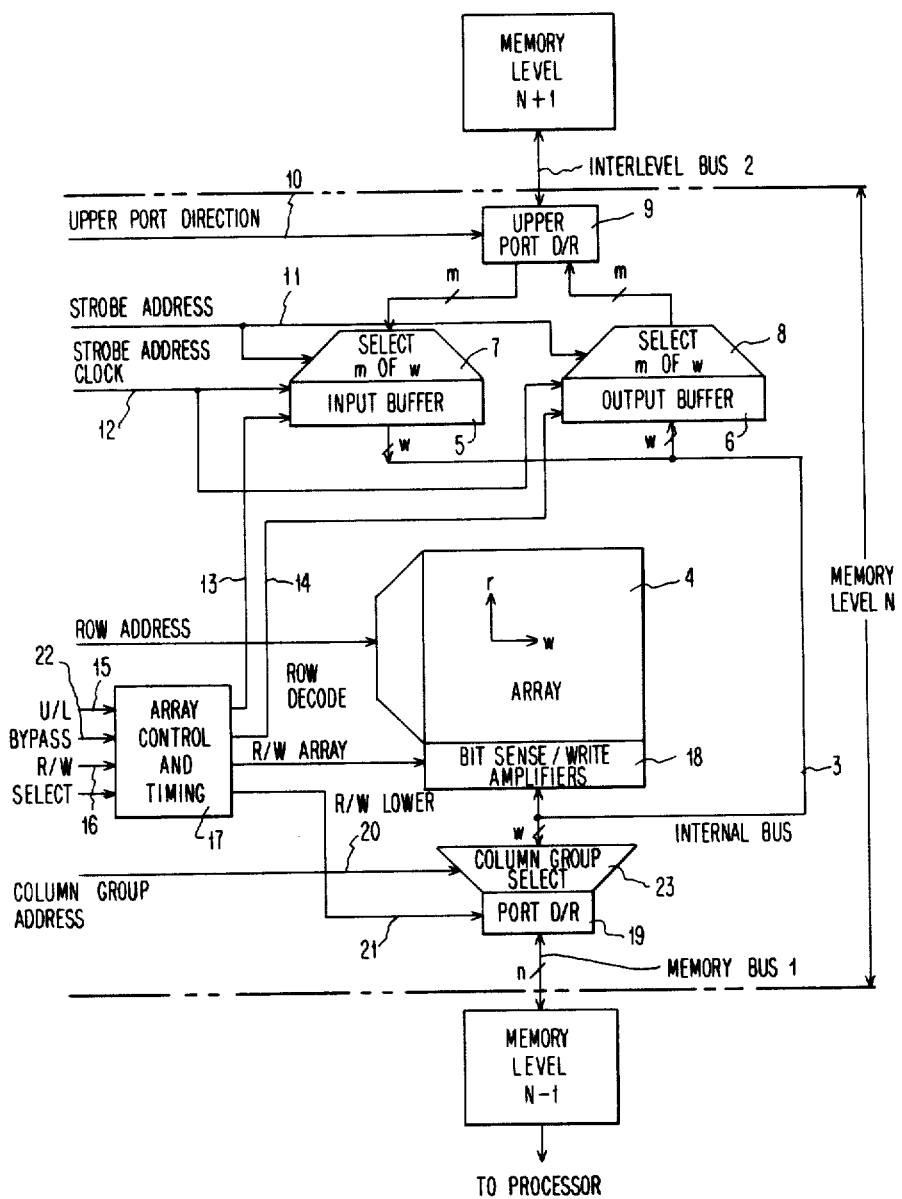

HIERARCHICAL MEMORIES HAVING TWO PORTS AT EACH SUBORDINATE MEMORY LEVEL

TECHNICAL FIELD

The present invention generally relates to hierarchical memory systems and, more particularly, to such a system employing buffered, dual data ports at one or more memory levels and separate bidirectional data busses to enable data transfer between the levels and with the processor while greatly reducing contention for use of bus facilities and contention for memory cycles.

BACKGROUND ART

Hierarchical memory systems for computers typically comprise memory levels having single data ports. Each level is accessed for reading or writing through a common data bus. Lower levels of the hierarchy (those closest to the computer processor) generally are faster but are of limited data capacity compared to higher levels of the hierarchy. Thus, the lowest level, for example, contains only a fraction of all the data that might be required to perform a given computer task. By proper management of the data which is retained at the lowest level at a given time, however, many of the memory accesses are made to the data stored therein.

Occasionally, access is required to data which is not present in the lowest level. It is sometimes necessary, when this happens, to "cast out" some of the old data in the lowest level to make available storage space for the newly required data. The new data must be brought into the lowest level after the old data has been cast out and stored in a higher memory level. There is normally only one data bus for accomplishing data transfers between memory levels and with the processor. Consequently, each level must contend for access to the bus in succession with the result that system performance is reduced and the design of the level controllers is made more complicated.

Memory arrays (corresponding to a single memory level in the above discussion) are known in which a plurality of data ports are provided whereby data may be read from one array location and written into another location in the same array during the same memory cycle. Such an arrangement is taught in the U.S. Pat. No. 4,125,877, issued to John R. Reinert on Nov. 14, 1978. However, no mention is made of memory hierarchies, much less how contention for use of a single data bus might be minimized in such an environment.

U.S. Pat. Nos. 3,806,888 and 4,020,466 disclose hierarchical memory systems, the former having a single data bus between levels and the latter having, in addition, an auxiliary data path for communicating to a lower level only that portion of the data of a higher level which has been changed either by addition or by modification. Generally, the transfer of data from a first level to a second level is performed only when the data store for the second level is free. Thus, neither patent teaches a solution to the problem of maximizing the speed of transferring data simultaneously to and from the same memory level.

DISCLOSURE OF INVENTION

A hierarchical memory system comprising one or more buffered, dual ported memory levels and two bidirectional data busses connected to the respective ports of each level, is provided for greatly reducing contention for use of memory bus facilities and contention for memory cycles. Each dual ported level, which is a group of identical semiconductor chips in a preferred embodiment, may be accessed independently, via the separate busses.

The data port (upper port) communicating with a higher memory level is provided with at least one, and preferably two, data buffers. The unit of data which is cast out to a higher level or fetched in from the higher level includes a number of bits equal to the width of each buffer and many times wider than the respective data bus. The bits of the aforesaid unit of data all come from (or go to) the same chip row of memory cells. Accordingly, a castout requires only one memory cycle to move data from its row of cells to the on-chip buffer and vice-versa. The contents of a filled buffer at a given level is transferred in subgroups to a higher level, without contention for memory cycles of the given level, over the memory bus between said levels. Similarly, data is transferred over the interlevel memory bus to the buffer of the given level without contention for memory cycles of the given level. The data is moved from the filled buffer into the array in one write cycle of the given level. This is independent of the transferring of data using the lower data port of the same level.

BRIEF DESCRIPTION OF THE DRAWING

The sole FIGURE is a simplified block diagram of a preferred species of the present invention.

BEST MODE FOR CARRYING OUT THE INVENTION

Referring to the sole FIGURE, portions of three memory levels of a memory hierarchy are shown for servicing a processor (not shown) connected to the lower data port of the cache level $N-1$. The upper data port of level $N-1$ is connected to the lower data port of memory level N which is shown in block diagram detail. The block diagram representation of the components of level N also generally applies to all of the double-ported memory levels of the hierarchy (for example, levels $N-1$ and N of the disclosed embodiment). Preferably, the components of each of the levels $N-1$ and N are located on respective groups of identical chips, one of which is represented in the drawing as level N. The upper data port of level N is connected to the sole data port of memory level $N+1$. Separate data busses 1 and 2 are provided for coupling level N to levels $N-1$ and $N+1$, respectively.

The bit widths of busses 1 and 2 are designated n and m, respectively, and can be equal to each other in some cases. The internal data bus 3 of level N is of bit width w which, in general, is many times (e.g. 16) wider than bus 2. The width w of bus 3 is equal to the number of bits in a single line (row) of memory cells of array 4 and is equal to the bit width of input buffer 5 and output buffer 6 connected to bus 3. The equal widths of bus 3, array 4 and buffers 5 and 6 permit the transfer of data from a line (row) of array 4 to or from the buffers to occur during a single cycle of array 4. The filling or emptying of the buffers through the upper port of level N takes place independent of the operation of array 4 through the lower port of level N.

Buffers 5 and 6 communicate with bus 2 via selectors 7 and 8 and upper port drivers/receivers 9, the latter being controlled by the upper port direction signal on line 10. Selector 7 responds to the strobe address signals on line 11 and to the address clock signals on line 12 which gate all of the m bits from bus 2 into respective portions of buffer 5 when the receivers of unit 9 are actuated by the signal on line 10. In the other mode of operation, selector 8 responds to the strobe address signals on line 11 and to the address clock signals on line 12 which gate to bus 2 a selected portion m of the w bits stored in buffer 6 when the drivers of unit 9 are actuated by the signal on line 10. A number of successive actuations of buffers 7 and 8 equal to the ratio w/m are required either to load buffer 5 from bus 2 or to empty buffer 6 into bus 2.

The actual coupling of buffers 5 and 6 to internal bus 3 is under the control of the respective signals on lines 13 and 14 which take into account the status of the "upper-lower" signal on line 15 and the "read-write" signal on line 16 at the inputs to array control and timing unit 17. That is, buffer 5 is coupled to bus 3 when the "upper" and "write" modes are designated by the signals on lines 15 and 16. Buffer 6 is coupled to bus 3 when the "upper" and "read" modes are designated by the signals on lines 15 and 16. Neither of buffers 5 and 6 are connected to bus 3 when the "lower" mode is designated by the signal on line 15.

The decoupling of buffers 5 and 6 from internal bus 3 when in the "lower" mode allows for the simultaneous independent accessing of the upper and lower data ports of memory level N. For example, array 4 can be read or written into via the lower port while input buffer 5 is being loaded from bus 2 or while output buffer 6 is being emptied into bus 2.

It should be noted that bus 3 normally is much wider than bus 1 and, for that reason, the coupling of the sense amplifiers or write amplifiers of unit 18 to the lower port drivers/receivers 19 is accomplished in bit groups, each being equal to the bit width of bus 1, under the control of the column group address signals on line 20 and the "read-write" signal on line 21. Every access in either direction through the lower port involves a cycle of the array 4. Not every access through the upper port involves a cycle of array 4. Each access through the lower part involves an n-bit subset of the w sense-amps, identified by column group select line 20.

From the foregoing, it can be seen that system performance is improved by reducing contention between the N−1 and N+1 memory levels for the available cycles of memory level N. For a given access data width between levels N and N−1, a multiple of data transfer cycles is required in order to complete the transfer of data between levels N+1 and N. This can incur a serious thruput penalty when both such transfers contend for cycles of level N. The provision of a second (upper), buffered data port on level N frees the lower data port of level N for the exclusive use of the next lower level accesses, and reduces contention for cycles of the level N array. In support of the upper port, a pair of buffers are provided, each sufficiently wide to contain the full transfer width of the array when communicating with the next higher level. In addition, the internal organization of the array is made as wide as the port buffer so that a single array access can fully load or unload a port buffer in a single cycle of the associated memory level.

An optional level N data "bypass" feature can be added to the system shown in the sole FIGURE by the relatively modest addition of a bypass control signal on line 22 and corresponding logic circuitry within unit 17 so that the first m bits of data input to buffer 5 are made available immediately on bus 3, without waiting for the complete filling of buffer 5, while the sense/write amplifiers 18 are deactivated and column select 23 and drivers 19 are activated.

Although the memory levels are designated in general terms (N−1, N and N+1) in the sole FIGURE, it will be recognized by those skilled in the art that, for example, the N−1 level could be the register space associated with a processor, the N level could be a cache and the N+1 level could be the main memory. In another application, level N−1 could be a cache, level N could be the main memory and level N+1 could be mass storage. Other hierarchical designs also are suitable.

We claim:

1. A hierarchical memory system having a plurality of memory levels,
    one or more of said levels having dual data ports, one of said ports being equipped with one or more data buffers,
    each of said one or more of said levels having a data storage array having a bit width equal to the bit width of said buffers,
    an internal data bus of bit width equal to said bit width of said array and said buffers for connecting said array to said buffers and to the other of said dual data ports, and
    first and second bidirectional data buses for interconnecting said buffered port to a higher memory level and for interconnecting said other port to a lower level, respectively.

2. The hierarchical memory system of claim 1 wherein said buffered port comprises a first selector and first driver and receiver means for interconnecting said first bidirectional bus to said data buffer via said first selector, the bit width of said first driver and receiver means and of said first selector being less than that of said buffer.

3. The hierarchical memory system of claim 2 wherein the bit width of said buffer is a multiple of the bit width of said first driver and receiver means and of said first selector.

4. The hierarchical memory system of claim 1 wherein said one of said dual data ports is equipped with two data buffers of equal bit width,
    no more than one of said buffers being operatively connected to said internal data bus at a given time.

5. The hierarchical memory system of claim 4 wherein neither of said two data buffers are operatively connected to said internal data bus when said internal data bus is in communication with said other of said dual data ports.

6. The hierarchical memory system of claim 4 wherein one of said buffers is in communication with said first data bus at the same time that said array is in communication with said second data bus.

7. The hierarchical memory system of claim 1 wherein said buffer is in communication with said first data bus independent of the communication of said array with said second data bus.

8. The hierarchical memory system of claim 1 wherein said higher memory level is main memory and said lower level is cache memory.

9. The hierarchical memory system of claim 1 wherein said other of said dual data ports comprises a second selector and second driver and receiver means for interconnecting said second bidirectional bus to said internal bus via said second selector, the bit width of said second driver and receiver means and of said second selector being less than that of said internal bus.

10. The hierarchical memory system of claim 8 wherein the bit width of said first selector is equal to the bit width of said second selector.

* * * * *